US009490487B2

(12) United States Patent
Ishida et al.

(10) Patent No.: US 9,490,487 B2
(45) Date of Patent: Nov. 8, 2016

(54) FUEL CELL

(71) Applicant: HONDA MOTOR CO., LTD., Tokyo (JP)

(72) Inventors: Kentaro Ishida, Wako (JP); Seiji Sugiura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 132 days.

(21) Appl. No.: 14/510,115

(22) Filed: Oct. 9, 2014

(65) Prior Publication Data
US 2015/0104729 A1 Apr. 16, 2015

(30) Foreign Application Priority Data

Oct. 11, 2013 (JP) .................. 2013-214011

(51) Int. Cl.
*H01M 8/0258* (2016.01)
*H01M 8/02* (2016.01)
*H01M 8/10* (2016.01)

(52) U.S. Cl.
CPC ......... *H01M 8/0202* (2013.01); *H01M 8/0258* (2013.01); *H01M 8/0273* (2013.01); *H01M 8/1004* (2013.01); *H01M 2250/20* (2013.01); *Y02E 60/50* (2013.01); *Y02T 90/32* (2013.01)

(58) Field of Classification Search
CPC .......... H01M 8/0258; H01M 8/0273
See application file for complete search history.

(56) References Cited

U.S. PATENT DOCUMENTS

| 7,736,785 B2 | 6/2010 | Oda et al. |
| 2010/0129694 A1 | 5/2010 | Sugiura et al. |
| 2012/0129071 A1 | 5/2012 | Sato et al. |
| 2012/0321987 A1* | 12/2012 | Goto .................. H01M 8/1002 429/480 |

FOREIGN PATENT DOCUMENTS

| JP | 5098212 B2 | 11/2007 |
| JP | 2008-293758 | 12/2008 |
| JP | 2009-140672 | 6/2009 |
| JP | 2012-164467 | 8/2012 |

OTHER PUBLICATIONS

Ishida et al. JP 2012164467 A machine translation (Aug. 2012).*

* cited by examiner

*Primary Examiner* — Carlos Barcena
*Assistant Examiner* — Wojciech Haske
(74) *Attorney, Agent, or Firm* — Mori & Ward, LLP

(57) ABSTRACT

A fuel cell includes a membrane electrode assembly, separators, and a second separator among the separators. The membrane electrode assembly includes an electrolyte membrane, a first electrode and a second electrode, and a resin frame member. A first separator among the separators facing the first electrode includes a fuel gas channel, a fuel gas manifold, and a fuel gas buffer. The second separator among the separators facing the second electrode includes an oxidant gas channel, an oxidant gas manifold, and an oxidant gas buffer. The fuel gas buffer includes a first fuel gas buffer region and a second fuel gas buffer region. The second fuel gas buffer region is more deeply grooved than the first fuel gas buffer region in a stacking direction. The oxidant gas buffer includes a first oxidant gas buffer region and a second oxidant gas buffer region.

14 Claims, 12 Drawing Sheets

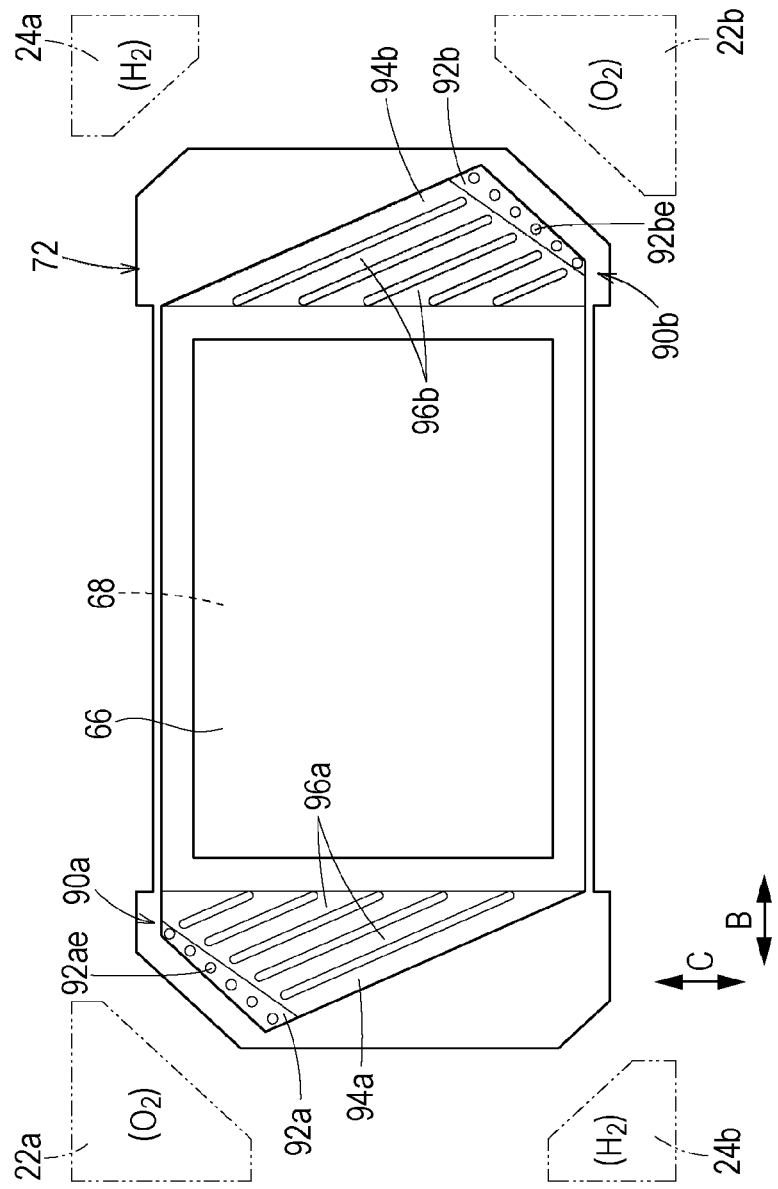

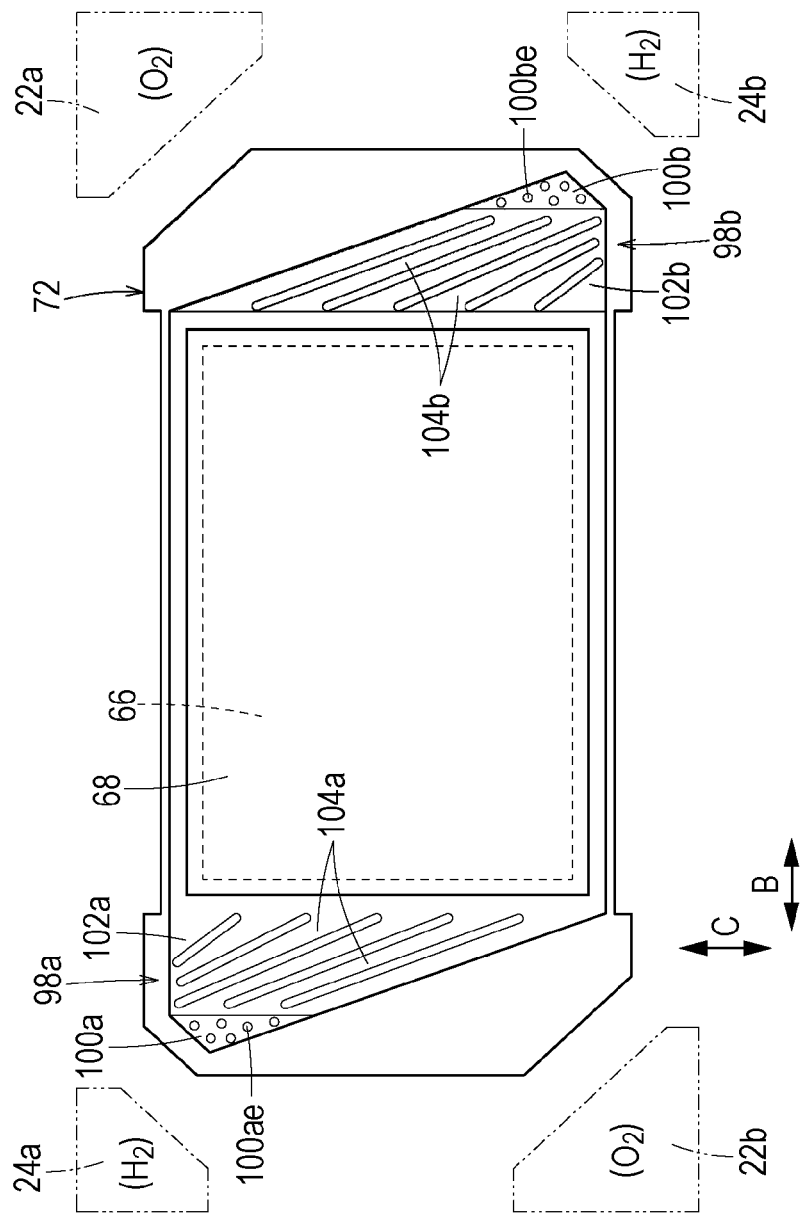

FUEL CELL

CROSS-REFERENCE TO RELATED APPLICATIONS

The present application claims priority under 35 U.S.C. §119 to Japanese Patent Application No. 2013-214011, filed Oct. 11, 2013, entitled "Fuel Cell." The contents of this application are incorporated herein by reference in their entirety.

BACKGROUND

1. Field

The present disclosure relates to a fuel cell.

2. Description of the Related Art

For example, a solid polymer electrolyte fuel cell includes a membrane electrode assembly (MEA), which includes a solid polymer electrolyte membrane and an anode electrode and a cathode electrode sandwiching the solid polymer electrolyte membrane therebetween. The solid polymer electrolyte membrane is made from a polymer ion-exchange membrane. The membrane electrode assembly and separators that sandwich the membrane electrode assembly therebetween constitute a power generation cell (unit cell). In fuel cells, ordinarily, a few tens of to a few hundred power generation cells are stacked, and used as, for example, a vehicle fuel cell stack.

For supplying a fuel gas and an oxidant gas, which are reactive gases, to an anode electrode and a cathode electrode of each of power generation cells that are stacked, fuel cells often have a so-called internal manifold structure.

Fuel cells having an internal manifold structure include reactive gas inlet manifolds (a fuel gas inlet manifold and an oxidant gas inlet manifold) and reactive gas outlet manifolds (a fuel gas outlet manifold and an oxidant gas outlet manifold). These manifolds extend through the fuel cells in a stacking direction thereof. The reactive gas inlet manifolds and the reactive gas outlet manifolds are connected to reactive gas channels (a fuel gas channel and an oxidant gas channel) for supplying a reactive gas along electrode surfaces. An inlet side and an outlet side of each reactive gas channel are connected to the corresponding reactive gas inlet manifold and to the corresponding reactive gas outlet manifold, respectively.

In this case, an opening area of each reactive gas inlet manifold and an opening area of each reactive gas outlet manifold are relatively small. Therefore, in order to cause smooth flow of the reactive gas over entire electrode reaction surfaces, a buffer that disperses the reactive gas needs to be provided in the vicinity of each reactive gas inlet manifold and each reactive gas outlet manifold.

For making it possible to uniformly and reliably supply a reactive gas over an entire reactive gas channel from a reactive gas inlet manifold via a buffer, for example, a fuel cell that is disclosed in Japanese Unexamined Patent Application Publication No. 2012-164467 is known. In this fuel cell, one of surfaces of a separator is provided with a first buffer through which a first reactive gas manifold is connected to a first reactive gas channel. In addition, the other surface of the separator is provided with a second buffer through which a second reactive gas manifold is connected to a second reactive gas channel.

The first buffer includes a first dedicated buffer region that is adjacent to the first reactive gas manifold and allows one of reactive gases to flow, and that restricts a flow of the other reactive gas at a side of the second buffer. The second buffer includes a second dedicated buffer region that is adjacent to the second reactive gas manifold and allows the other reactive gas to flow, and that restricts the flow of the one of the reactive gases at a side of the first buffer.

Here, the first buffer and the second buffer include a common buffer region that allows the one of the reactive gases and the other of the reactive gases to flow. Further, the depth of the first dedicated buffer region and the depth of the second dedicated buffer region are greater than the depth of the common buffer region.

This makes it possible to uniformly and reliably supply the corresponding reactive gas from the first reactive gas manifold to the entire first reactive gas channel via the first buffer, and the corresponding reactive gas from the second reactive gas manifold to the entire second reactive gas channel via the second buffer.

SUMMARY

According to one aspect of the present invention, a fuel cell includes a membrane electrode assembly and separators that are stacked. The membrane electrode assembly includes an electrolyte membrane and a pair of electrodes sandwiching the electrolyte membrane therebetween. The membrane electrode assembly is provided with a resin frame member at an outer peripheral portion of the membrane electrode assembly. The separator facing one of the electrodes includes a fuel gas channel, a fuel gas manifold, and a fuel gas buffer. The fuel gas channel allows a fuel gas to be supplied along an electrode surface. The fuel gas manifold allows the fuel gas to flow in a stacking direction in which the membrane electrode assembly and the separators are stacked. The fuel gas buffer connects the fuel gas channel and the fuel gas manifold to each other. The separator facing the other of the electrodes includes an oxidant gas channel, an oxidant gas manifold, and an oxidant gas buffer. The oxidant gas channel allows an oxidant gas to be supplied along an electrode surface. The oxidant gas manifold allows the oxidant gas to flow in the stacking direction. The oxidant gas buffer connects the oxidant gas channel and the oxidant gas manifold to each other. The fuel gas buffer includes a first fuel gas buffer region and a second fuel gas buffer region. The second fuel gas buffer region is more deeply grooved than the first fuel gas buffer region in the stacking direction. The oxidant gas buffer includes a first oxidant gas buffer region and a second oxidant gas buffer region. The second oxidant gas buffer region is more deeply grooved than the first oxidant gas buffer region in the stacking direction and is deeply grooved in a direction opposite to the second fuel gas buffer region. The second fuel gas buffer region and the second oxidant gas buffer region are arranged such that a position of the second fuel gas buffer region in plan view and a position of the second oxidant gas buffer region in plan view are shifted from each other as seen from the stacking direction. The resin frame member includes a fuel gas recess and an oxidant gas recess. The fuel gas recess overlaps the second fuel gas buffer region in the stacking direction. The oxidant gas recess overlaps the second oxidant gas buffer region in the stacking direction.

According to another aspect of the present invention, a fuel cell includes a membrane electrode assembly, separators, and a second separator among the separators. The membrane electrode assembly includes an electrolyte membrane, a first electrode and a second electrode, and a resin frame member. The first electrode and the second electrode sandwich the electrolyte membrane therebetween. The resin frame member is provided at an outer peripheral portion of the membrane electrode assembly. The separators with the membrane electrode assembly are stacked in a stacking direction. A first separator among the separators facing the first electrode includes a fuel gas channel, a fuel gas manifold, and a fuel gas buffer. The fuel gas channel allows a fuel gas to be supplied along an electrode surface. The fuel gas manifold allows the fuel gas to flow in the stacking direction. The fuel gas buffer connects the fuel gas channel and the fuel gas manifold to each other. The second separator among the separators facing the second electrode includes an oxidant gas channel, an oxidant gas manifold, and an oxidant gas buffer. The oxidant gas channel allows an oxidant gas to be supplied along an electrode surface. The oxidant gas manifold allows the oxidant gas to flow in the stacking direction. The oxidant gas buffer connects the oxidant gas channel and the oxidant gas manifold to each other. The fuel gas buffer includes a first fuel gas buffer region and a second fuel gas buffer region. The second fuel gas buffer region is more deeply grooved than the first fuel gas buffer region in the stacking direction. The oxidant gas buffer includes a first oxidant gas buffer region and a second oxidant gas buffer region. The second oxidant gas buffer region is more deeply grooved than the first oxidant gas buffer region in the stacking direction and is deeply grooved in a direction opposite to the second fuel gas buffer region. The second fuel gas buffer region and the second oxidant gas buffer region are arranged such that a position of the second fuel gas buffer region in plan view and a position of the second oxidant gas buffer region in plan view are shifted from each other as seen from the stacking direction. The resin frame member includes a fuel gas recess and an oxidant gas recess. The fuel gas recess overlaps the second fuel gas buffer region in the stacking direction. The oxidant gas recess overlaps the second oxidant gas buffer region in the stacking direction.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 11 is an explanatory view of one of surfaces of a second membrane electrode assembly of the power generation unit.

FIG. 12 is an explanatory view of the other surface of the second membrane electrode assembly.

DESCRIPTION OF THE EMBODIMENTS

Figure 1:
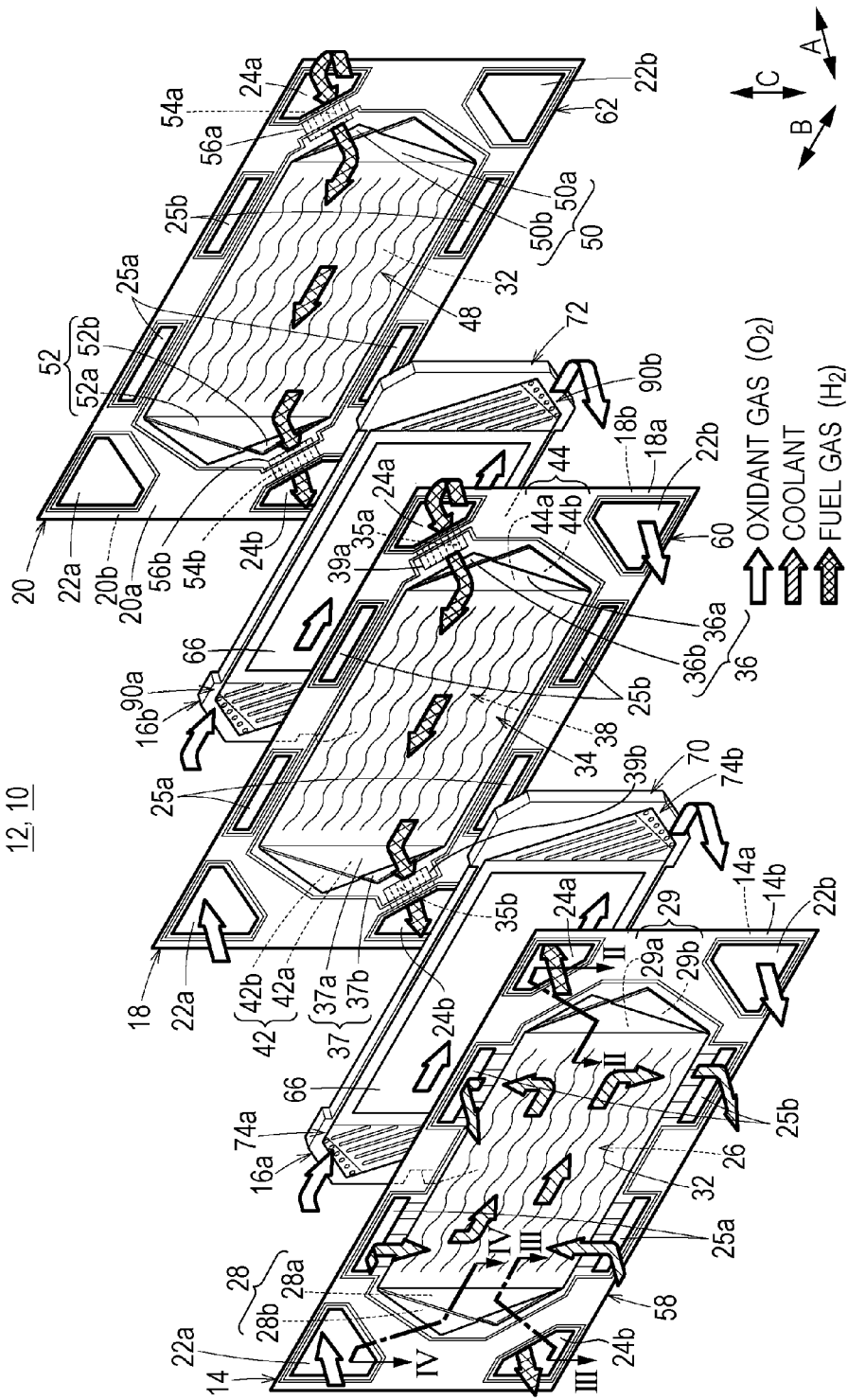
FIG. 1 is an exploded perspective explanatory view of a main portion of a power generation unit of a fuel cell according to an embodiment of the present disclosure.

The embodiments will now be described with reference to the accompanying drawings, wherein like reference numerals designate corresponding or identical elements throughout the various drawings.

Referring to FIGS. 1 to 4, a fuel cell 10 according to an embodiment of the present disclosure includes a plurality of power generation units 12 that are stacked in a horizontal direction (direction of arrow A) or a vertical direction (direction of arrow C). The fuel cell 10 is used, for example, as a vehicle fuel cell stack that is mounted on a fuel cell electric automobile (not shown).

Each power generation unit 12 includes a first metal separator 14, a first membrane electrode assembly 16a, a second metal separator 18, a second membrane electrode assembly 16b, and a third metal separator 20.

Each of the first metal separator 14, the second metal separator 18, and the third metal separator 20 is made from, for example, a steel plate, a stainless steel plate, an aluminum plate, or a galvanized steel plate. Each of the first metal separator 14, the second metal separator 18, and the third metal separator 20 has a rectangular shape in plan view and has an undulating shape in a cross-sectional view as a result of press-forming a thin metal plate. Instead of the first metal separator 14, the second metal separator 18, and the third metal separator 20, carbon separators may be used.

As shown in FIG. 1, an oxidant gas inlet manifold (oxidant gas manifold) 22a and a fuel gas outlet manifold (fuel gas manifold) 24b are formed in one end portion of each of the first metal separator 14, the second metal separator 18, and the third metal separator 20 in a long-side direction thereof (direction of arrow B). The oxidant gas inlet manifolds 22a of the metal separators 14, 18, and 20 are connected in the direction of arrow A. The fuel gas outlet manifolds 24b of the metal separators 14, 18, and 20 are connected in the direction of arrow A. An oxidant gas, such as an oxygen-containing gas, is supplied through each oxidant gas inlet manifold 22a. A fuel gas, such as a hydrogen-containing gas, is discharged to each fuel gas outlet manifold 24b.

A fuel gas inlet manifold (fuel gas manifold) 24a, through which a fuel gas is supplied, and an oxidant gas outlet manifold (oxidant gas manifold) 22b, through which an oxidant gas is discharged, are formed in the other end of each of the first metal separator 14, the second metal separator 18, and the third metal separator 20 in the long-side direction. The fuel gas inlet manifolds 24a of the metal separators 14, 18, and 20 are connected in the direction of arrow A. The oxidant gas outlet manifolds 22b of the metal separators 14, 18, and 20 are connected in the direction of arrow A.

Two ends of each of the first metal separator 14, the second metal separator 18, and the third metal separator 20 in a short-side direction thereof (direction of arrow C) are provided with two coolant inlet manifolds 25a at a side of the oxidant gas inlet manifold 22a. The coolant inlet manifolds 25a of the metal separators 14, 18, and 20 are connected in the direction of arrow A. Two ends of each of the first metal separator 14, the second metal separator 18, and the third metal separator 2 in the short-side direction thereof are provided with two coolant outlet manifolds 25b, through which the coolant is discharged, at a side of the fuel gas inlet manifold 24a. The coolant outlet manifolds 25b of the metal separators 14, 18, and 20 are connected in the direction of arrow A.

Figure 5:
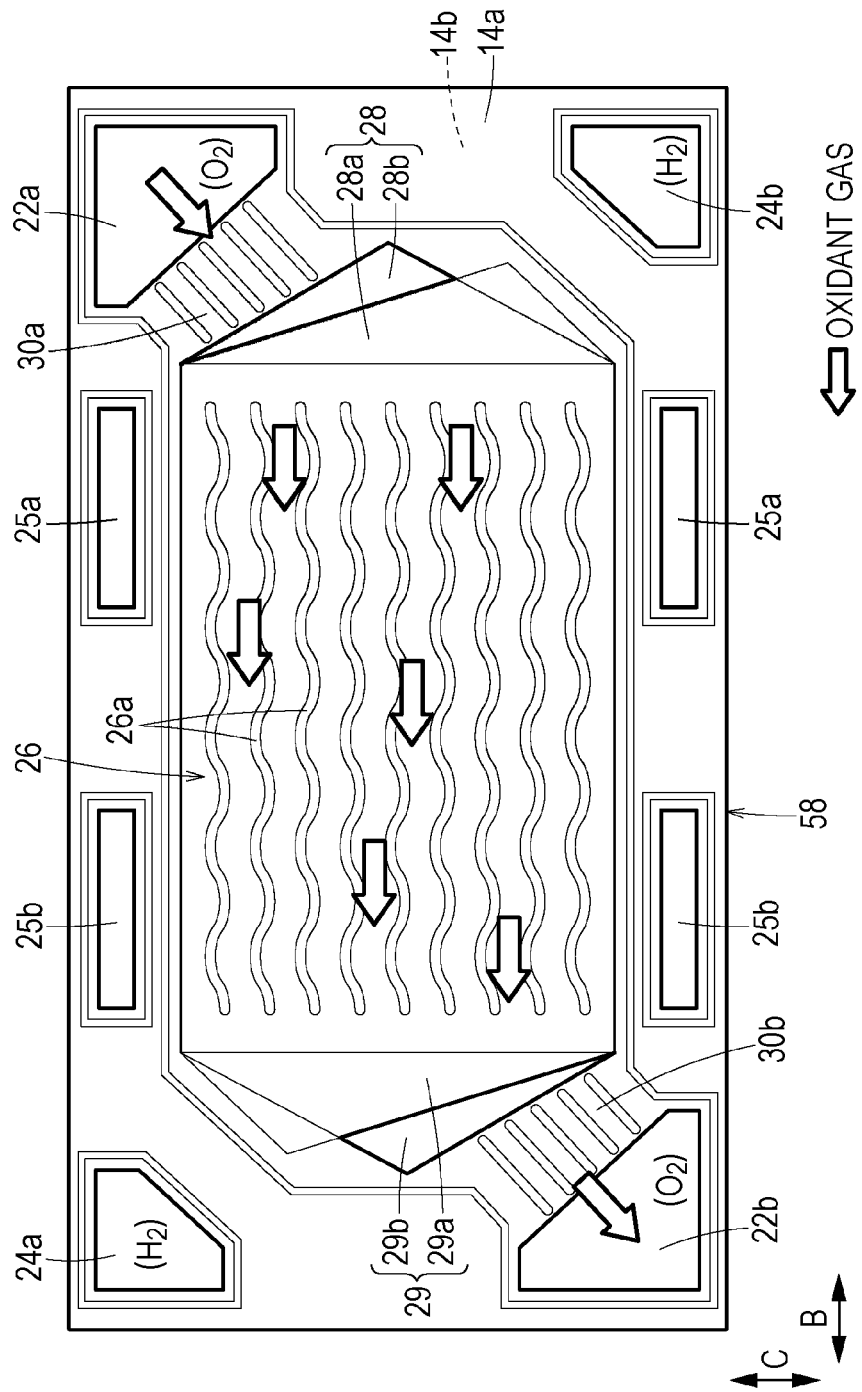
FIG. 5 is an explanatory view of one of surfaces of a first metal separator of the power generation unit.

As shown in FIG. 5, a first oxidant gas channel 26, through which the oxidant gas inlet manifold 22a is connected to the oxidant gas outlet manifold 22b, is formed at a surface 14a of the first metal separator 14 facing the first membrane electrode assembly 16a.

The first oxidant gas channel 26 includes a plurality of wave-shaped channel grooves (or linear channel grooves) 26a extending in the direction of arrow B. A first oxidant gas inlet buffer 28 and a first oxidant gas outlet buffer 29 are provided in the vicinity of an inlet of the first oxidant gas channel 26 and in the vicinity of an outlet of the first oxidant gas channel 26, respectively.

The first oxidant gas inlet buffer 28 has a triangular shape. The first oxidant gas inlet buffer 28 includes a first oxidant gas inlet buffer region 28a that is adjacent to the first oxidant gas channel 26. The first oxidant gas inlet buffer region 28a is planarly provided at a neutral position of the first metal separator 14 in a thickness direction, that is, at a position where neither a protruding portion nor a recessed portion is formed at the surface 14a and a surface 14b. The first oxidant gas inlet buffer 28 also includes a second oxidant gas inlet buffer region 28b that is adjacent to the oxidant gas inlet manifold 22a and that is more deeply grooved than the first oxidant gas inlet buffer region 28a in the stacking direction. The second oxidant gas inlet buffer region 28b is formed at one side of a triangle.

The first oxidant gas outlet buffer 29 has a triangular shape. The first oxidant gas outlet buffer 29 includes a first oxidant gas outlet buffer region 29a that is adjacent to the first oxidant gas channel 26. The first oxidant gas outlet buffer region 29a is provided at a neutral position of the first metal separator 14 in the thickness direction. The first oxidant gas outlet buffer 29 also includes a second oxidant gas outlet buffer region 29b that is adjacent to the oxidant gas outlet manifold 22b and that is more deeply grooved than the first oxidant gas outlet buffer region 29a in the stacking direction. The second oxidant gas outlet buffer region 29b is formed at one side of a triangle.

A plurality of inlet connection grooves 30a are formed between the second oxidant gas inlet buffer region 28b and the oxidant gas inlet manifold 22a. A plurality of outlet connection grooves 30b are formed between the second oxidant gas outlet buffer region 29b and the oxidant gas outlet manifold 22b.

Figure 6:
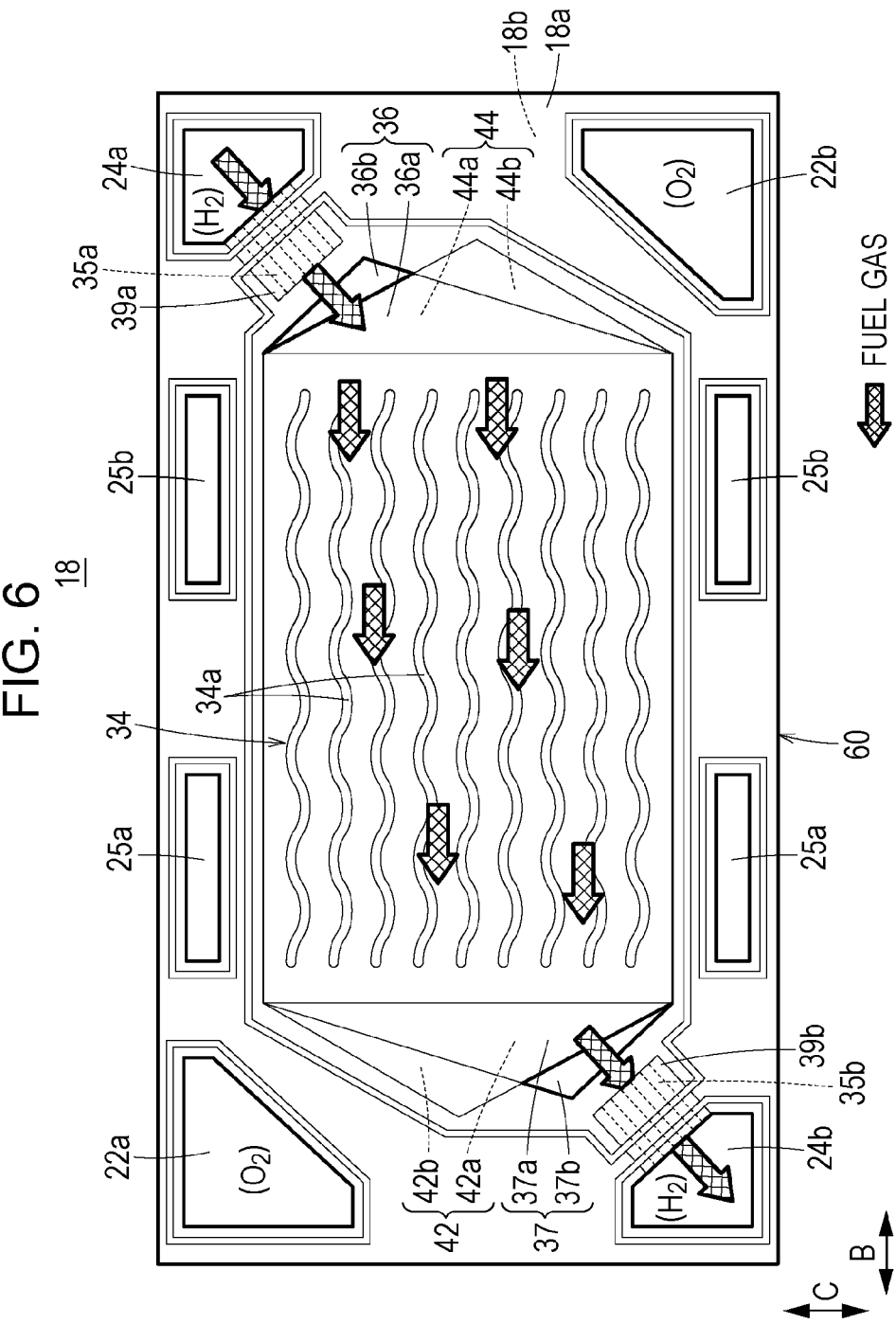
FIG. 6 is an explanatory view of one of surfaces of a second metal separator of the power generation unit.

As shown in FIG. 6, a first fuel gas channel 34, through which the fuel gas inlet manifold 24a is connected to the fuel gas outlet manifold 24b, is formed at a surface 18a of the second metal separator 18 facing the first membrane electrode assembly 16a. The first fuel gas channel 34 includes a plurality of plurality of wave-shaped channel grooves (or linear channel grooves) 34a extending in the direction of arrow B. A first fuel gas inlet buffer 36 and a first fuel gas outlet buffer 37 are provided in the vicinity of an inlet of the first fuel gas channel 34 and in the vicinity of an outlet of the first fuel gas channel 34, respectively.

The first fuel gas inlet buffer 36 has a triangular shape. The first fuel gas inlet buffer 36 includes a first fuel gas inlet buffer region 36a that is adjacent to the first fuel gas channel 34. The first fuel gas inlet buffer region 36a is planarly provided at a neutral position of the second metal separator 18 in a thickness direction, that is, at a position where neither a protruding portion nor a recessed portion is formed at the surface 18a and a surface 18b. The first fuel gas inlet buffer 36 also includes a second fuel gas inlet buffer region 36b that is adjacent to the fuel gas inlet manifold 24a and that is more deeply grooved than the first fuel gas inlet buffer region 36a in the stacking direction. The second fuel gas inlet buffer region 36b is formed at one side of a triangle.

The first fuel gas outlet buffer 37 has a triangular shape. The first fuel gas outlet buffer 37 includes a first fuel gas outlet buffer region 37a that is adjacent to the first fuel gas channel 34. The first fuel gas outlet buffer region 37a is provided at a neutral position of the second metal separator 18 in the thickness direction. The first fuel gas outlet buffer 37 also includes a second fuel gas outlet buffer region 37b that is adjacent to the fuel gas outlet manifold 24b and that is more deeply grooved than the first fuel gas outlet buffer region 37a in the stacking direction. The second fuel gas outlet buffer region 37b is formed at one side of a triangle.

A plurality of inlet connection grooves 35a are formed between the first fuel gas inlet buffer region 36a and the fuel gas inlet manifold 24a. The inlet connection grooves 35a are covered with a covering 39a. A plurality of outlet connection grooves 35b are formed between the second fuel gas outlet buffer region 37b and the fuel gas outlet manifold 24b. The outlet connection grooves 35b are covered with a covering 39b.

Figure 7:
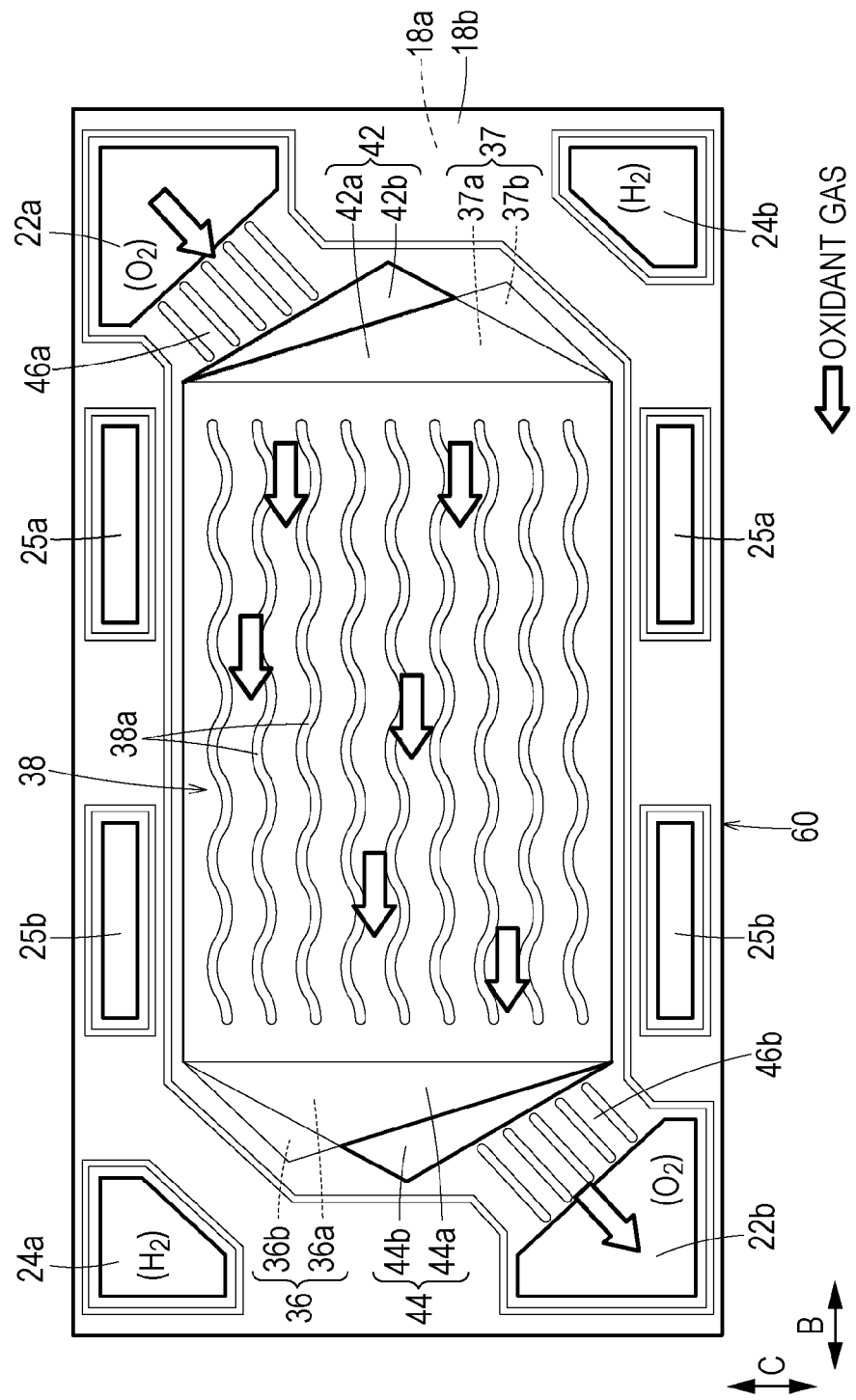
FIG. 7 is an explanatory view of the other surface of the second metal separator.

As shown in FIG. 7, a second oxidant gas channel 38, through which the oxidant gas inlet manifold 22a is connected to the oxidant gas outlet manifold 22b, is formed at a surface 18b of the second metal separator 18 facing the second membrane electrode assembly 16b. The second oxidant gas channel 38 includes a plurality of wave-shaped channel grooves (or linear channel grooves) 38a extending in the direction of arrow B. The shape of the back surface of the second oxidant gas channel 38 of the second metal separator 18 is the shape of the first fuel gas channel 34.

A second oxidant gas inlet buffer 42 and a second oxidant gas outlet buffer 44 are provided, respectively, in the vicinity of an inlet of the second oxidant gas channel 38 and in the vicinity of an outlet of the second oxidant gas channel 38. The second oxidant gas inlet buffer 42 has a triangular shape. The second oxidant gas inlet buffer 42 includes a first oxidant gas inlet buffer region 42a that is adjacent to the second oxidant gas channel 38. The first oxidant gas inlet buffer region 42a is provided at a neutral position of the second metal separator 18 in the thickness direction. The second oxidant gas inlet buffer 42 also includes a second oxidant gas inlet buffer region 42b that is adjacent to the oxidant gas inlet manifold 22a and that is more deeply grooved than the first oxidant gas inlet buffer region 42a in the stacking direction. The second oxidant gas inlet buffer region 42b is formed at one side of the triangle.

The second oxidant gas outlet buffer 44 has a triangular shape. The second oxidant gas outlet buffer 44 includes a first oxidant gas outlet buffer region 44a that is adjacent to the second oxidant gas channel 38. The first oxidant gas outlet buffer region 44a is provided at a neutral position of the second metal separator 18 in the thickness direction. The second oxidant gas outlet buffer 44 also includes a second oxidant gas outlet buffer region 44b that is adjacent to the oxidant gas outlet manifold 22b and that is more deeply grooved than the first oxidant gas outlet buffer region 44a in the stacking direction. The second oxidant gas outlet buffer region 44b is formed at one side of the triangle.

A plurality of inlet connection grooves 46a are formed between the second oxidant gas inlet buffer region 42b and the oxidant gas inlet manifold 22a. A plurality of outlet connection grooves 46b are formed between the second oxidant gas outlet buffer region 44b and the oxidant gas outlet manifold 22b.

The first fuel gas inlet buffer 36 and the second oxidant gas outlet buffer 44 have triangular shapes that have a common base and are such that the height of the apex of the first fuel gas inlet buffer 36 that is adjacent to the fuel gas inlet manifold 24a and the height of the apex of the second oxidant gas outlet buffer 44 that is adjacent to the oxidant gas outlet manifold 22b differ from each other. The second fuel gas inlet buffer region 36b and the second oxidant gas outlet buffer region 44b are formed at two adjacent sides of the triangle.

The first fuel gas outlet buffer 37 and the second oxidant gas inlet buffer 42 have triangular shapes that have a common base and are such that the height of the apex of the first fuel gas outlet buffer 37 that is adjacent to the fuel gas outlet manifold 24b and the height of the apex of the second oxidant gas inlet buffer 42 that is adjacent to the oxidant gas inlet manifold 22a differ from each other. The second fuel gas outlet buffer region 37b and the second oxidant gas inlet buffer region 42b are formed at two adjacent sides of the triangle.

When air is used as an oxidant gas, the flow rate of the air that is supplied when power is generated is greater than the flow rate of hydrogen (fuel gas). Therefore, the first fuel gas inlet buffer 36 and the second oxidant gas outlet buffer 44 and the first fuel gas outlet buffer 37 and the second oxidant gas inlet buffer 42 are asymmetrically shaped.

Figure 8:
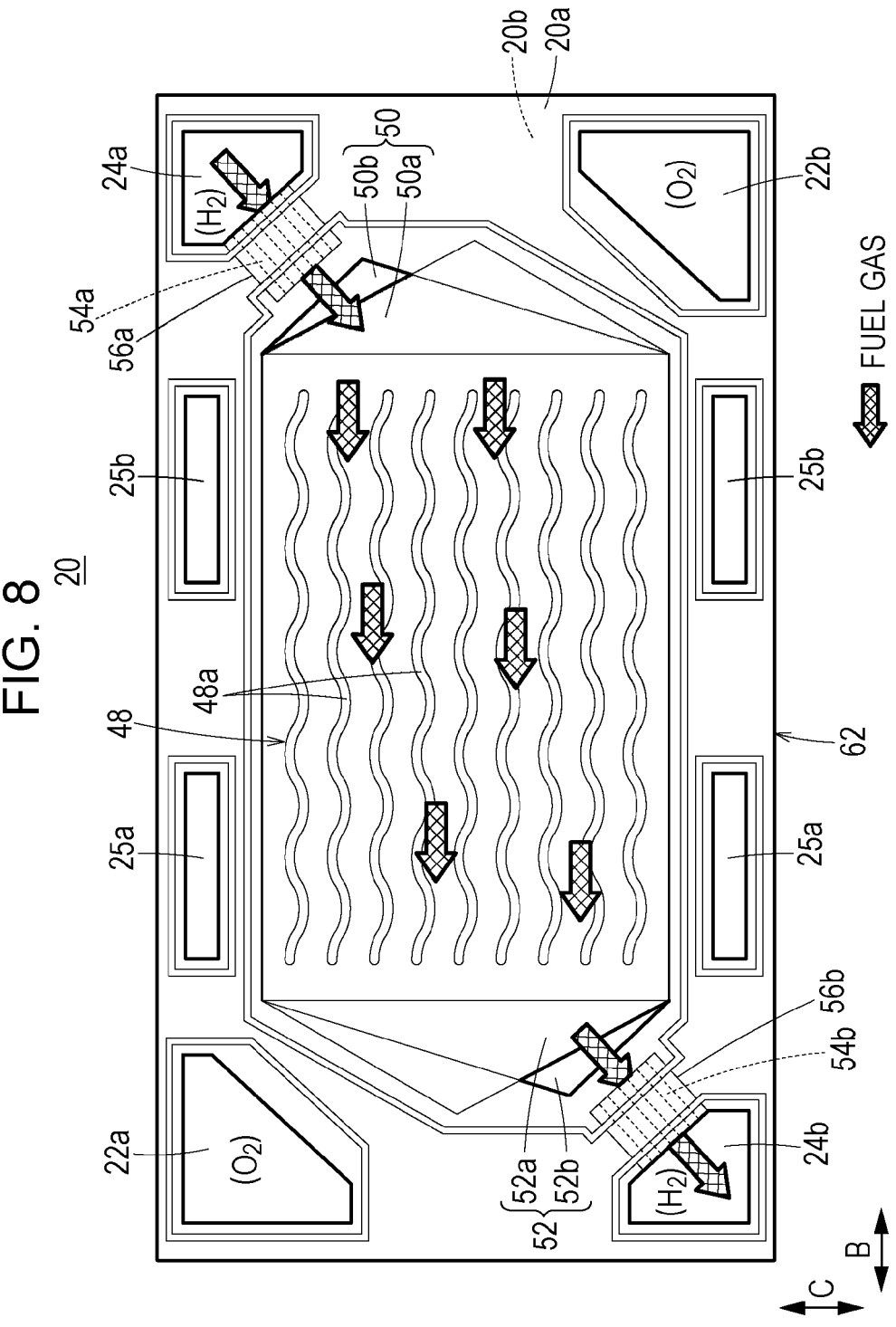
FIG. 8 is an explanatory view of one of surfaces of a third metal separator of the power generation unit.

As shown in FIG. 8, a second fuel gas channel 48, through which the fuel gas inlet manifold 24a is connected to the fuel gas outlet manifold 24b, is formed at a surface 20a of the third metal separator 20 facing the second membrane electrode assembly 16b. The second fuel gas channel 48 includes a plurality of wave-shaped channel grooves (or linear channel grooves) 48a extending in the direction of arrow B. A second fuel gas inlet buffer 50 and a second fuel gas outlet buffer 52 are provided in the vicinity of an inlet of the second fuel gas channel 48 and in the vicinity of an outlet of the second fuel gas channel 48, respectively.

The second fuel gas inlet buffer 50 has a triangular shape. The second fuel gas inlet buffer 50 includes a first fuel gas inlet buffer region 50a that is adjacent to the second fuel gas channel 48. The first fuel gas inlet buffer region 50a is planarly provided at a neutral position of the third metal separator 20 in a thickness direction, that is, at a position where neither a protruding portion nor a recessed portion is formed at the surface 20a and a surface 20b. The second fuel gas inlet buffer 50 also includes a second fuel gas inlet buffer region 50b that is adjacent to the fuel gas inlet manifold 24a and that is more deeply grooved than the first fuel gas inlet buffer region 50a in the stacking direction. The second fuel gas inlet buffer region 50b is formed at one side of a triangle.

The second fuel gas outlet buffer 52 has a triangular shape. The second fuel gas outlet buffer 52 includes a first fuel gas outlet buffer region 52a that is adjacent to the second fuel gas channel 48. The first fuel gas outlet buffer region 52a is provided at a neutral position of the third metal separator 20 in the thickness direction. The second fuel gas outlet buffer 52 also includes a second fuel gas outlet buffer region 52b that is adjacent to the fuel gas outlet manifold 24b and that is more deeply grooved than the first fuel gas outlet buffer region 52a in the stacking direction. The second fuel gas outlet buffer region 52b is formed at one side of a triangle.

A plurality of inlet connection grooves 54a are formed between the second fuel gas inlet buffer region 50b and the fuel gas inlet manifold 24a. The inlet connection grooves 54a are covered with a covering 56a. A plurality of outlet connection grooves 54b are formed between the second fuel gas outlet buffer region 52b and the fuel gas outlet manifold 24b. The outlet connection grooves 54b are covered with a covering 56b.

As shown in FIG. 1, part of a coolant channel 32, which forms the shape of the back surface of the second fuel gas channel 48, is formed in the surface 20b of the third metal separator 20. By placing the surface 14b of the first metal separator 14, which is adjacent to the third metal separator 20, on the surface 20b of the corresponding third metal separator 20, the coolant channel 32 is integrally provided.

A first sealing member 58 is integrally formed on the surfaces 14a and 14b of the first metal separator 14 so as to surround an outer peripheral edge portion of the first metal separator 14. A second sealing member 60 is integrally formed on the surfaces 18a and 18b of the second metal separator 18 so as to surround an outer peripheral edge portion of the second metal separator 18. A third sealing member 62 is integrally formed on the surfaces 20a and 20b of the third metal separator 20 so as to surround an outer peripheral edge portion of the third metal separator 20.

Each of the first sealing member 58, the second sealing member 60, and the third sealing member 62 is made from an elastic material such as a sealing material, a cushioning material, or a packing material. Examples of such materials include EPDM, NBR, fluorocarbon rubber, silicone rubber, fluorosilicone rubber, butyl rubber, natural rubber, styrene rubber, chloroprene rubber, and acrylic rubber.

Figure 2:
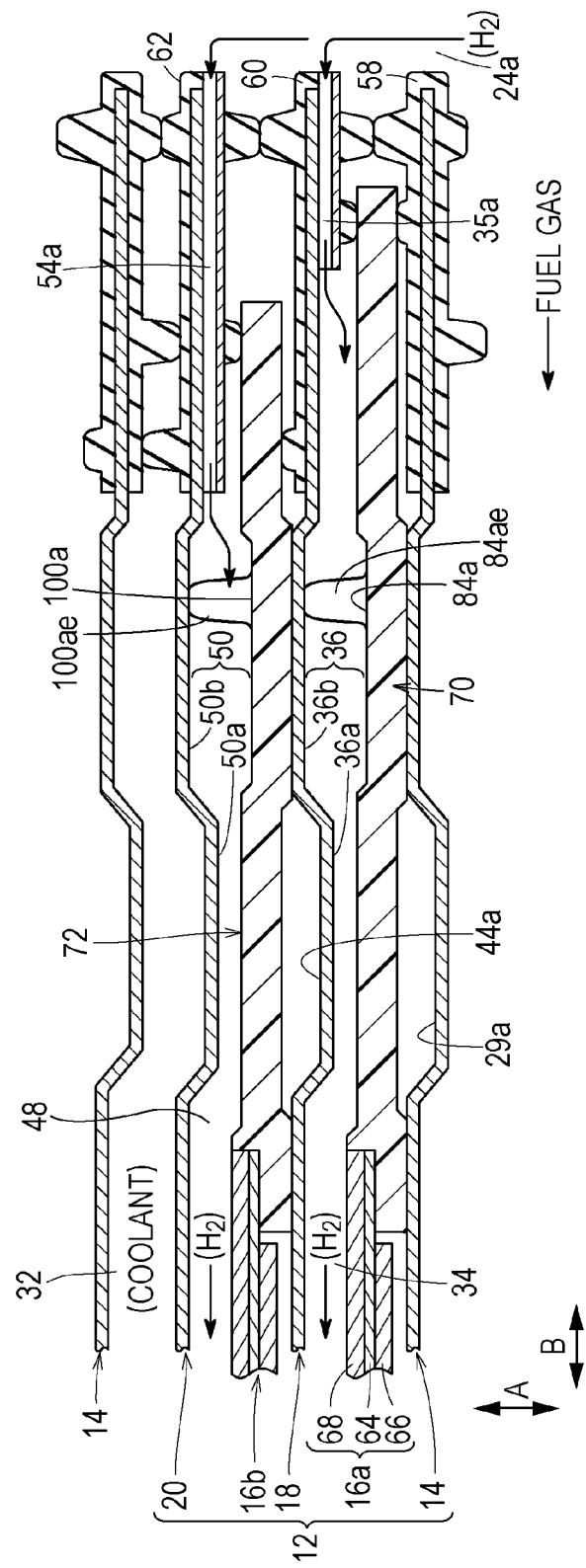
FIG. 2 is an explanatory sectional view of the power generation unit taken along line II-II in FIG. 1.
Figure 3:
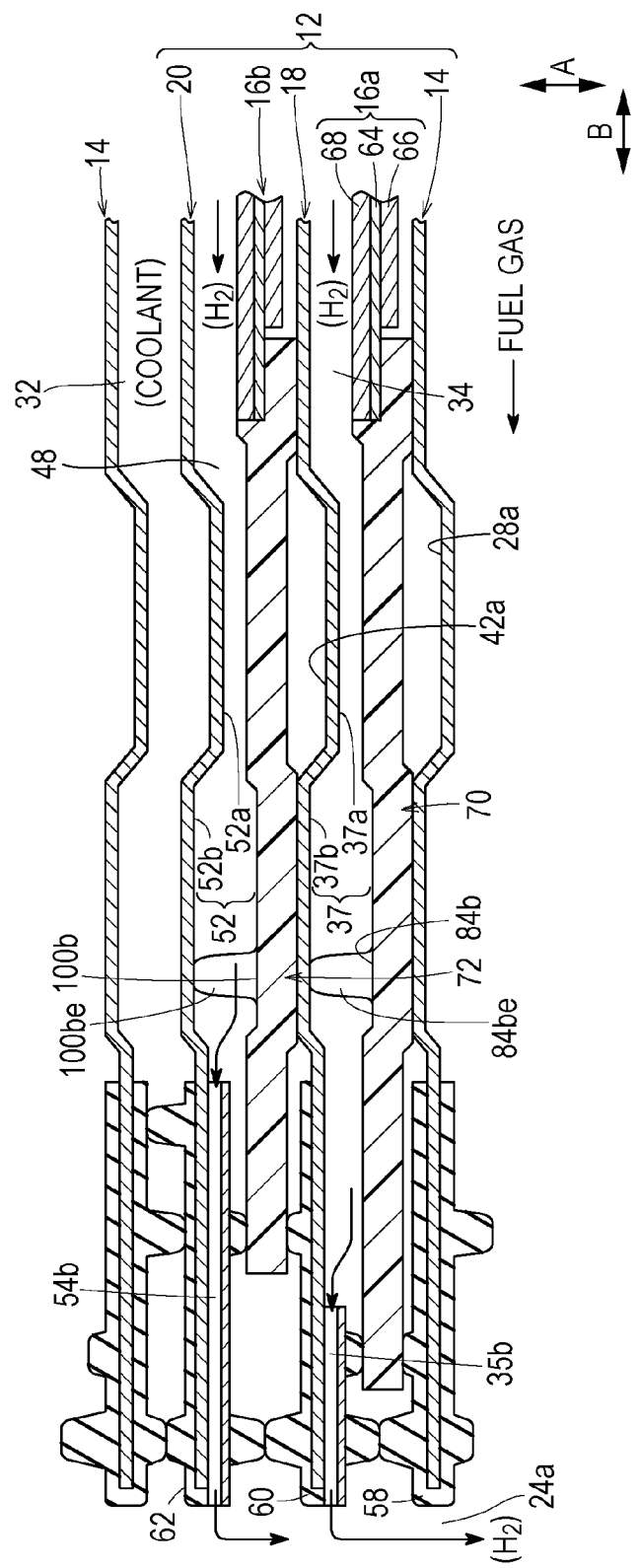
FIG. 3 is an explanatory sectional view of the power generation unit taken along line in FIG. 1.
Figure 4:
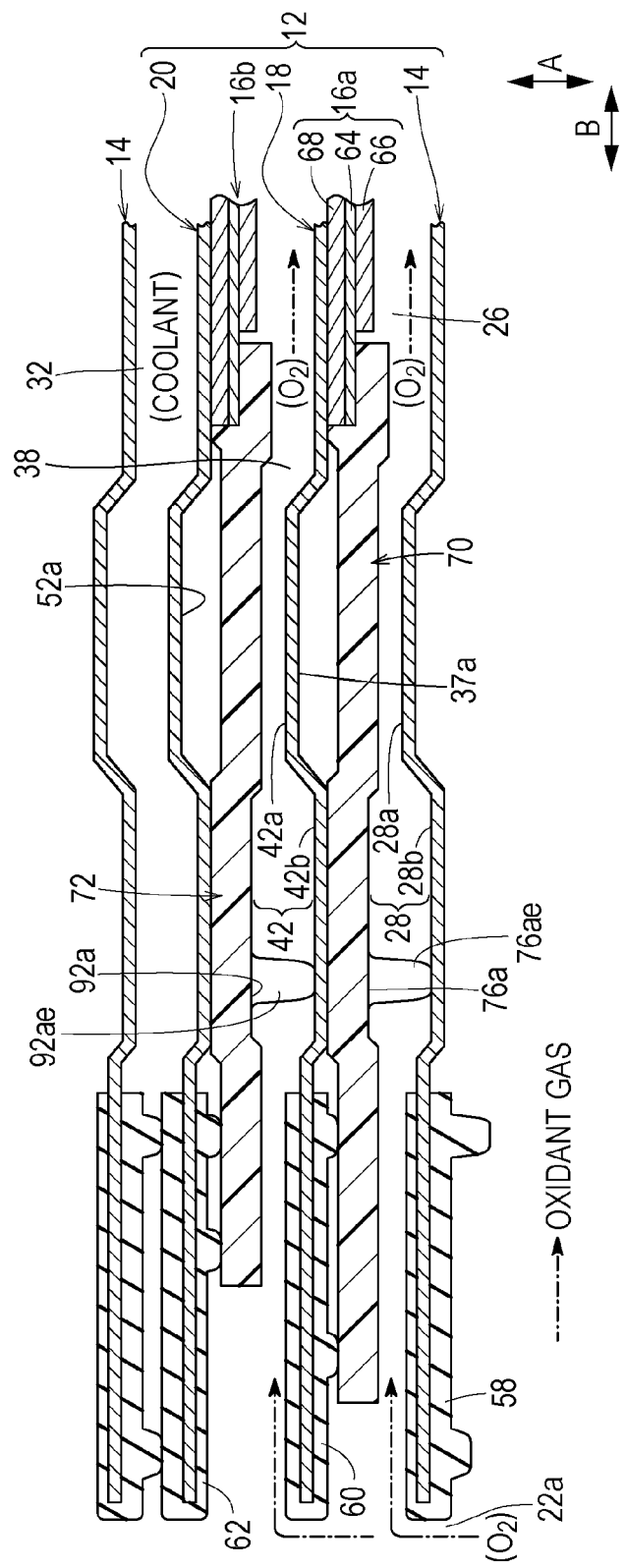
FIG. 4 is an explanatory sectional view of the power generation unit taken along line IV-IV in FIG. 1.

As shown in FIGS. 2 to 4, the first membrane electrode assembly 16a and the second membrane electrode assembly 16b each include a solid polymer electrolyte membrane 64. The solid polymer electrolyte membrane 64 is, for example, a thin film that is made of perfluorosulfonic acid and soaked with water. The solid polymer electrolyte membrane 64 is sandwiched by a cathode electrode 66 and an anode electrode 68.

The cathode electrode 66 forms a stepped MEA having a size in plan view that is smaller than the size of the anode electrode 68 in plan view and the size of the solid polymer electrolyte membrane 64 in plan view. The cathode electrode 66, the anode electrode 68, and the solid polymer electrolyte membrane 64 may have the same size in plan view. Alternatively, the anode electrode 68 may have a size in plan view that is smaller than those of the cathode electrode 66 and the solid polymer electrolyte membrane 64.

Each of the cathode electrode 66 and the anode electrode 68 includes a gas diffusion layer (not shown), made of carbon paper or the like, and an electrode catalyst layer (not shown), formed by uniformly coating a surface of the gas diffusion layer with porous carbon particles whose surfaces support a platinum alloy. The electrode catalyst layers are disposed on both sides of the solid polymer electrolyte membrane 64.

The first membrane electrode assembly 16a is such that a first resin frame member (resin frame member) 70 is, for example, integrally formed on an outer peripheral edge portion of the solid polymer electrolyte membrane 64 by injection molding or the like, with the first resin frame member 70 being positioned outwardly from a terminal end of the cathode electrode 66. The second membrane electrode assembly 16b is such that a second resin frame member (resin frame member) 72 is, for example, integrally formed on an outer peripheral edge portion of the solid polymer electrolyte membrane 64 by injection molding or the like, with the second resin frame member 72 being positioned outwardly from a terminal end of the cathode electrode 66. Examples of resin materials of the first resin frame member 70 and the second resin frame member 72 include, in addition to commodity plastic, engineering plastic and super engineering plastic.

Figure 9:
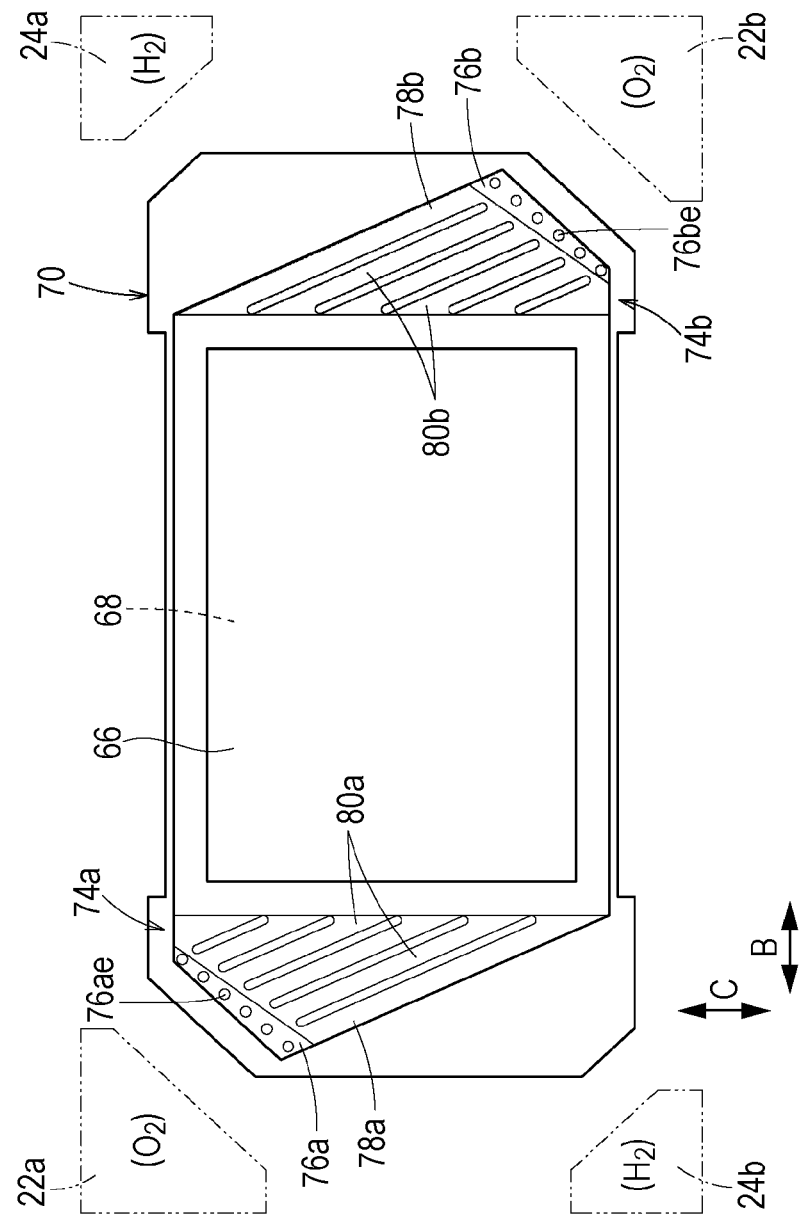
FIG. 9 is an explanatory view of one of surfaces of a first membrane electrode assembly of the power generation unit.
Figure 10:
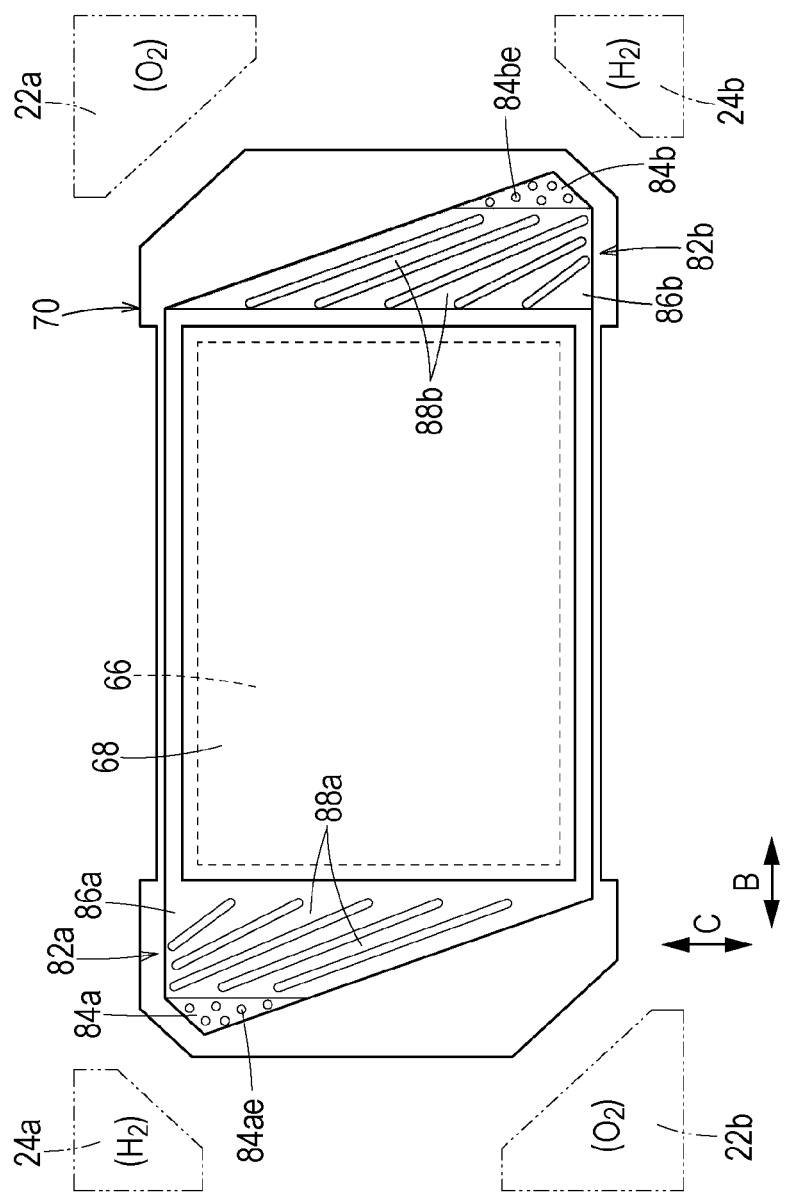
FIG. 10 is an explanatory view of the other surface of the first membrane electrode assembly.

As shown in FIGS. 9 and 10, the first resin frame member 70 has a shape bulging towards the oxidant gas inlet manifold 22a, the oxidant gas outlet manifold 22b, the fuel gas inlet manifold 24a, and the fuel gas outlet manifold 24b. As shown in FIG. 9, a surface of the first resin frame member 70 at a side of the cathode electrode 66 is provided with an inlet buffer 74a that is positioned between the oxidant gas inlet manifold 22a and an inlet side of the first oxidant gas channel 26. An outlet buffer 74b is provided so as to be positioned between the oxidant gas outlet manifold 22b and an outlet side of the first oxidant gas channel 26.

The inlet buffer 74a includes an inlet deeply embossed region (oxidant gas recess) 76a that is adjacent to the oxidant gas inlet manifold 22a and that overlaps the second oxidant gas inlet buffer region 28b of the first metal separator 14 in the stacking direction. A planar region of the inlet deeply embossed region 76a and a planar region of the second oxidant gas inlet buffer region 28b are aligned as seen from the stacking direction. The inlet deeply embossed region 76a includes a plurality of embossed sections (or flat surfaces) 76ae in a deep groove region having a triangular shape. A top portion of each embossed section 76ae contacts the second oxidant gas inlet buffer region 28b. An inlet shallow buffer region 78a that is more shallowly grooved than the inlet deeply embossed region 76a is provided adjacently to the inlet deeply embossed region 76a. The inlet shallow buffer region 78a is provided with a plurality of inlet guide channels 80a.

The outlet buffer 74b includes an outlet deeply embossed region (oxidant gas recess) 76b that is adjacent to the oxidant gas outlet manifold 22b and that overlaps the second oxidant gas outlet buffer region 29b of the first metal separator 14 in the stacking direction. A planar region of the outlet deeply embossed region 76b and a planar region of the second oxidant gas outlet buffer region 29b are aligned as seen from the stacking direction. The outlet deeply embossed region 76b includes a plurality of embossed sections (or flat surfaces) 76be in a deep groove region having a triangular shape. A top portion of each embossed section 76be contacts the second oxidant gas outlet buffer region 29b. An outlet shallow buffer region 78b that is more shallowly grooved than the outlet deeply embossed region 76b is provided adjacently to the outlet deeply embossed region 76b. The outlet shallow buffer region 78b is provided with a plurality of outlet guide channels 80b.

As shown in FIG. 10, a surface of the first resin frame member 70 at a side of the anode electrode 68 is provided with an inlet buffer 82a that is positioned between the fuel gas inlet manifold 24a and the first fuel gas channel 34. An outlet buffer 82b is provided so as to be positioned between the fuel gas outlet manifold 24b and the first fuel gas channel 34.

The inlet buffer 82a includes an inlet deeply embossed region (fuel gas recess) 84a that is adjacent to the fuel gas inlet manifold 24a and that overlaps the second fuel gas inlet buffer region 36b of the second metal separator 18 in the stacking direction. A planar region of the inlet deeply embossed region 84a and a planar region of the second fuel gas inlet buffer region 36b are aligned as seen from the stacking direction. The inlet deeply embossed region 84a includes a plurality of embossed sections (or flat surfaces) 84ae in a deep groove region having a triangular shape. A top portion of each embossed section 84ae contacts the second fuel gas inlet buffer region 36b. An inlet shallow buffer region 86a that is more shallowly grooved than the inlet deep embossed region 84a is provided adjacently to the inlet deeply embossed region 84a. The inlet shallow buffer region 86a is provided with a plurality of inlet guide channels 88a.

The outlet buffer 82b includes an outlet deeply embossed region (fuel gas recess) 84b that is adjacent to the fuel gas outlet manifold 24b and that overlaps the second fuel gas outlet buffer region 37b of the second metal separator 18 in the stacking direction. A planar region of the outlet deeply embossed region 84b and a planar region of the second fuel gas outlet buffer region 37b are aligned as seen from the stacking direction. The outlet deeply embossed region 84b includes a plurality of embossed sections (or flat surfaces) 84be in a deep groove region having a triangular shape. A top portion of each embossed section 84be contacts the second fuel gas outlet buffer region 37b. An outlet shallow buffer region 86b that is more shallowly grooved than the outlet deep embossed region 84b is provided adjacently to the outlet deeply embossed region 84b. The outlet shallow buffer region 86b is provided with a plurality of outlet guide channels 88b.

As shown in FIGS. 11 and 12, the second resin frame member 72 has a shape bulging towards the oxidant gas inlet manifold 22a, the oxidant gas outlet manifold 22b, the fuel gas inlet manifold 24a, and the fuel gas outlet manifold 24b. As shown in FIG. 11, a surface of the second resin frame member 72 at a side of the cathode electrode 66 is provided with an inlet buffer 90a that is positioned between the oxidant gas inlet manifold 22a and an inlet side of the second oxidant gas channel 38. An outlet buffer 90b is provided so as to be positioned between the oxidant gas outlet manifold 22b and an outlet side of the second oxidant gas channel 38.

The inlet buffer 90a includes an inlet deeply embossed region (oxidant gas recess) 92a that is adjacent to the oxidant gas inlet manifold 22a and that overlaps the second oxidant gas inlet buffer region 42b of the second metal separator 18 in the stacking direction. A planar region of the inlet deeply embossed region 92a and a planar region of the second oxidant gas inlet buffer region 42b are aligned as seen from the stacking direction. The inlet deeply embossed region 92a includes a plurality of embossed sections (or flat surfaces) 92ae in a deep groove region having a triangular shape. A top portion of each embossed section 92ae contacts the second oxidant gas inlet buffer region 42b. An inlet shallow buffer region 94a that is more shallowly grooved than the inlet deeply embossed region 92a is provided adjacently to the inlet deeply embossed region 92a. The inlet shallow buffer region 94a is provided with a plurality of inlet guide channels 96a.

The outlet buffer 90b includes an outlet deeply embossed region (oxidant gas recess) 92b that is adjacent to the oxidant gas outlet manifold 22b and that overlaps the second oxidant gas outlet buffer region 44b of the second metal separator 18 in the stacking direction. A planar region of the outlet deeply embossed region 92b and a planar region of the second oxidant gas outlet buffer region 44b are aligned as seen from the stacking direction. The outlet deeply embossed region 92b includes a plurality of embossed sections (or flat surfaces) 92be in a deep groove region having a triangular shape. A top portion of each embossed section 92be contacts the second oxidant gas outlet buffer region 44b. An outlet shallow buffer region 94b that is more shallowly grooved than the outlet deeply embossed region 92b is provided adjacently to the outlet deeply embossed region 92b. The outlet shallow buffer region 94b is provided with a plurality of outlet guide channels 96b.

As shown in FIG. 12, a surface of the second resin frame member 72 at a side of the anode electrode 68 is provided with an inlet buffer 98a that is positioned between the fuel gas inlet manifold 24a and the second fuel gas channel 48. An outlet buffer 98b is provided so as to be positioned between the fuel gas outlet manifold 24b and the second fuel gas channel 48.

The inlet buffer 98a includes an inlet deeply embossed region (fuel gas recess) 100a that is adjacent to the fuel gas inlet manifold 24a and that overlaps the second fuel gas inlet buffer region 50b of the third metal separator 20 in the stacking direction. A planar region of the inlet deeply embossed region 100a and a planar region of the second fuel gas inlet buffer region 50b are aligned as seen from the stacking direction. The inlet deeply embossed region 100a includes a plurality of embossed sections (or flat surfaces) 100ae in a deep groove region having a triangular shape. A top portion of each embossed section 100ae contacts the second fuel gas inlet buffer region 50b. An inlet shallow buffer region 102a that is more shallowly grooved than the inlet deeply embossed region 100a is provided adjacently to the inlet deeply embossed region 100a. The inlet shallow buffer region 102a is provided with a plurality of inlet guide channels 104a.

The outlet buffer 98b includes an outlet deeply embossed region (fuel gas recess) 100b that is adjacent to the fuel gas outlet manifold 24b and that overlaps the second fuel gas outlet buffer region 52b of the third metal separator 20 in the stacking direction. A planar region of the outlet deep embossed region 100b and a planar region of the second fuel gas outlet buffer region 52b are aligned as seen from the stacking direction. The outlet deeply embossed region 100b includes a plurality of embossed sections (or flat surfaces) 100be in a deep groove region having a triangular shape. A top portion of each embossed section 100be contacts the second fuel gas outlet buffer region 52b. An outlet shallow buffer region 102b that is more shallowly grooved than the outlet deeply embossed region 100b is provided adjacently to the outlet deeply embossed region 100b. The outlet shallow buffer region 102b is provided with a plurality of outlet guide channels 104b.

By stacking the power generation units 12 upon each other, a coolant channel 32 is formed between the first metal separator 14 of one of the power generation units 12 and the third metal separator 20 of another power generation unit 12.

The operation of the fuel cell 10 having such a structure is described below.

Referring to FIG. 1, first, an oxidant gas, such as an oxygen-containing gas, is supplied to each oxidant gas inlet manifold 22a, and a fuel gas, such as a hydrogen-containing gas, is supplied to each fuel gas inlet manifold 24a. In addition, a coolant, such as pure water, ethylene glycol, or oil, is supplied to each coolant inlet manifold 25a.

Therefore, the oxidant gas is supplied from the oxidant gas inlet manifold 22a to the first oxidant gas channel 26 of the first metal separator 14 via the inlet buffer 74a and the first oxidant gas inlet buffer 28 (see FIGS. 4 and 5). Excess oxidant gas is introduced from the oxidant gas inlet manifold 22a to the second oxidant gas channel 38 of the second metal separator 18 via the inlet buffer 90a and the second oxidant gas inlet buffer 42 (see FIG. 7).

As shown in FIGS. 1, 5, and 7, the oxidant gas flows along the first oxidant gas channel 26 in the direction of arrow B (horizontal direction), and is supplied to the cathode electrode 66 of the first membrane electrode assembly 16a. Similarly, the oxidant gas flows along the second oxidant gas channel 38 in the direction of arrow B, and is supplied to the cathode electrode 66 of the second membrane electrode assembly 16b.

As shown in FIGS. 1, 6, and 10, the fuel gas is supplied from the fuel gas inlet manifold 24a to the inlet buffer 82a and the first fuel gas inlet buffer 36 via the inlet connection grooves 35a of the second metal separator 18. Similarly, as shown in FIGS. 1, 8, and 12, the fuel gas is supplied to the inlet buffer 98a and the second fuel gas inlet buffer 50 via the inlet connection grooves 54a of the third metal separator 20. Therefore, the fuel gas is supplied to the first fuel channel 34 of the second metal separator 18 and the second fuel gas channel 48 of the third metal separator 20.

The fuel gas flows along the first fuel gas channel 34 in the direction of arrow B, and is supplied to the anode electrode 68 of the first membrane electrode assembly 16a. Similarly, the fuel gas flows along the second fuel gas channel 48 in the direction of arrow B, and is supplied to the anode electrode 68 of the second membrane electrode assembly 16b.

Therefore, in the first membrane electrode assembly 16a and the second membrane electrode assembly 16b, the oxidant gas that is supplied to each of the cathode electrodes 66 and the fuel gas that is supplied to each of the anode electrodes 68 are consumed in electrochemical reactions in electrode catalyst layers, thus generating electric power.

Next, the oxidant gas, which has been supplied to the cathode electrode 66 of the first membrane electrode assembly 16a and the cathode electrode 66 of the second membrane electrode assembly 16b and consumed, is discharged to the outlet buffers 74b and 90b. The oxidant gas is discharged to the oxidant gas outlet manifolds 22b, respectively, from the first oxidant gas outlet buffer 29 and the second oxidant gas outlet buffer 44.

The fuel gas, which has been supplied to the anode electrode 68 of the first membrane electrode assembly 16a and the anode electrode 68 of the second membrane electrode assembly 16b and consumed, is discharged to the outlet buffers 82b and 98b. The fuel gas is discharged to the fuel gas outlet manifolds 24b, respectively, from the first fuel gas outlet buffer 37 and the second fuel gas outlet buffer 52 via the outlet connection grooves 35b and 54b.

As shown in FIG. 1, the coolant supplied to the pair of left and right coolant inlet manifolds 25a is introduced into the coolant channel 32. The coolant is supplied to the coolant channel 32 from each of the coolant inlet manifolds 25a, and, then, temporarily flows inward in the direction of arrow C. Then, the coolant flows in the direction of arrow B and cools the first membrane electrode assembly 16a and the second membrane electrode assembly 16b. After flowing outward in the direction of arrow C, the coolant is discharged to the pair of coolant outlet manifolds 25b.

In this case, in the embodiment, for example, as shown in FIG. 6, the surface 18a of the second metal separator 18 is provided with the second fuel gas inlet buffer region 36b and the second fuel gas outlet buffer region 37b, which are deeply grooved buffer sections. As shown in FIG. 7, the surface 18b of the second metal separator 18 is provided with the second oxidant gas inlet buffer region 42b and the second oxidant gas outlet buffer region 44b, which are deeply grooved buffer sections.

The second fuel gas inlet buffer region 36b and the second oxidant gas outlet buffer region 44b are formed such that their positions in plan view are shifted from each other, more specifically, in correspondence with two adjacent sides of a triangle. Similarly, the second fuel gas outlet buffer region 37*b* and the second oxidant gas inlet buffer region 42*b* are formed such that their positions in plan view are shifted from each other, more specifically, in correspondence with two adjacent sides of a triangle.

Further, as shown in FIG. 10, the first resin frame member 70 is provided with the inlet deeply embossed region (fuel gas recess) 84*a* that overlaps the second fuel gas inlet buffer region 36*b* in the stacking direction. The first resin frame member 70 is also provided with the outlet deeply embossed region (fuel gas recess) 84*b* that overlaps the second fuel gas outlet buffer region 37*b* in the stacking direction.

Similarly, as shown in FIG. 11, the second resin frame member 72 is provided with the inlet deeply embossed region (oxidant gas recess) 92*a* that overlaps the second oxidant gas inlet buffer region 42*b* in the stacking direction. The second resin frame member 72 is also provided with the outlet deeply embossed region (oxidant gas recess) 92*b* that overlaps the second oxidant gas outlet buffer region 44*b* in the stacking direction.

Therefore, at the first fuel gas inlet buffer 36, the second fuel gas inlet buffer region 36*b*, which is a deeply grooved buffer section, and the inlet deeply embossed region 84*a*, which is a fuel gas recess, overlap each other, and a relatively large inlet buffer space can be formed in the stacking direction. In addition, at the first fuel gas outlet buffer 37, the second fuel gas outlet buffer region 37*b*, which is a deeply grooved buffer section, and an outlet deeply embossed region 84*b*, which is a fuel gas recess, overlap each other, and a relatively large outlet buffer space can be formed in the stacking direction.

Therefore, the fuel gas is smoothly supplied from the fuel gas inlet manifold 24*a* to the first fuel gas channel 34, and from the first fuel gas channel 34 to the fuel gas outlet manifold 24*b*. This makes it possible to uniformly and reliably supply the fuel gas to the entire first fuel gas channel 34. In addition, it is possible to minimize the size of the fuel cell 10 in the stacking direction and, thus, make the entire fuel cell 10 compact.

Similarly, in the second fuel gas channel 48, the fuel gas can smoothly and reliably flow through the second fuel gas inlet buffer 50 and the second fuel gas outlet buffer 52, so that the same advantages as those provided by the first fuel gas channel 34 can be provided. Even in the first oxidant gas channel 26 and the second oxidant gas channel 38, the same advantages as those provided by the first fuel gas channel 34 are provided.

According to the present disclosure, a fuel cell includes a membrane electrode assembly and separators that are stacked. The membrane electrode assembly includes an electrolyte membrane and a pair of electrodes sandwiching the electrolyte membrane therebetween. The membrane electrode assembly is provided with a resin frame member at an outer peripheral portion of the membrane electrode assembly. The separator facing one of the electrodes includes a fuel gas channel and a fuel gas manifold. The fuel gas channel allows a fuel gas to be supplied along an electrode surface. The fuel gas manifold allows the fuel gas to flow in a stacking direction in which the membrane electrode assembly and the separators are stacked. The fuel gas channel and the fuel gas manifold are connected to each other by a fuel gas buffer.

The separator facing the other of the electrodes includes an oxidant gas channel and an oxidant gas manifold. The oxidant gas channel allows an oxidant gas to be supplied along an electrode surface. The oxidant gas manifold allows the oxidant gas to flow in the stacking direction. The oxidant gas channel and the oxidant gas manifold are connected to each other by an oxidant gas buffer.

The fuel gas buffer includes a first fuel gas buffer region and a second fuel gas buffer region. The second fuel gas buffer region is more deeply grooved than the first fuel gas buffer region in the stacking direction. The oxidant gas buffer includes a first oxidant gas buffer region and a second oxidant gas buffer region. The second oxidant gas buffer region is more deeply grooved than the first oxidant gas buffer region in the stacking direction and is deeply grooved in a direction opposite to the second fuel gas buffer region.

The second fuel gas buffer region and the second oxidant gas buffer region are arranged such that a position of the second fuel gas buffer region in plan view and a position of the second oxidant gas buffer region in plan view are shifted from each other as seen from the stacking direction. The resin frame member includes a fuel gas recess and an oxidant gas recess. The fuel gas recess overlaps the second fuel gas buffer region in the stacking direction. The oxidant gas recess overlaps the second oxidant gas buffer region in the stacking direction.

In the fuel cell, preferably, the fuel gas buffer and the oxidant gas buffer each have a triangular shape in front view, and the second fuel gas buffer region and the second oxidant gas buffer region are formed at two adjacent sides of a triangle.

In the fuel cell, preferably, the fuel gas recess of the resin frame member is provided with a fuel gas embossed portion, and a top portion of the fuel gas embossed portion contacts the second fuel gas buffer region. In addition, preferably, the oxidant gas recess of the resin frame member is provided with an oxidant gas embossed portion, and a top portion of the oxidant gas embossed portion contacts the second oxidant gas buffer region.

In the fuel cell, preferably, a planar region of the fuel gas recess of the resin frame member and a planar region of the second fuel gas buffer region are aligned as seen from the stacking direction, and a planar region of the oxidant gas recess of the resin frame member and a planar region of the second oxidant gas buffer region are aligned as seen from the stacking direction.

According to the present disclosure, the second fuel gas buffer region and the second oxidant gas buffer region, which are deeply grooved buffer sections, are arranged such that their positions in plan view are shifted from each other. In addition, the resin frame member is provided with a fuel gas recess and an oxidant gas recess that overlap the second fuel gas buffer region and the second oxidant gas buffer region, respectively.

Therefore, it is possible to properly supply a fuel gas to the fuel gas buffer and an oxidant gas to the oxidant gas buffer, and to uniformly and reliably supply the fuel gas to the entire fuel gas channel and the oxidant gas to the entire oxidant gas channel. In addition, it is possible to minimize the size of the fuel cell in the stacking direction and, thus, to make it compact.

Obviously, numerous modifications and variations of the present invention are possible in light of the above teachings. It is therefore to be understood that within the scope of the appended claims, the invention may be practiced otherwise than as specifically described herein.

What is claimed is:

1. A fuel cell comprising:
   a membrane electrode assembly and separators that are stacked, the membrane electrode assembly including an electrolyte membrane and a pair of electrodes sandwiching the electrolyte membrane therebetween, the membrane electrode assembly being provided with a resin frame member at an outer peripheral portion of the membrane electrode assembly, wherein the separators include a first separator facing one of the electrodes includes a fuel gas channel, a fuel gas manifold, and a fuel gas buffer, the fuel gas channel allowing a fuel gas to be supplied along an electrode surface, the fuel gas manifold allowing the fuel gas to flow in a stacking direction in which the membrane electrode assembly and the separators are stacked, the fuel gas buffer connecting the fuel gas channel and the fuel gas manifold to each other, wherein the separators include a second separator facing the other of the electrodes includes an oxidant gas channel, an oxidant gas manifold, and an oxidant gas buffer, the oxidant gas channel allowing an oxidant gas to be supplied along an electrode surface, the oxidant gas manifold allowing the oxidant gas to flow in the stacking direction, the oxidant gas buffer connecting the oxidant gas channel and the oxidant gas manifold to each other, wherein the fuel gas buffer includes a first fuel gas buffer region and a second fuel gas buffer region, the second fuel gas buffer region being more deeply grooved than the first fuel gas buffer region in the stacking direction, wherein the oxidant gas buffer includes a first oxidant gas buffer region and a second oxidant gas buffer region, the second oxidant gas buffer region being more deeply grooved than the first oxidant gas buffer region in the stacking direction and being deeply grooved in a direction opposite to the second fuel gas buffer region, wherein the second fuel gas buffer region and the second oxidant gas buffer region are arranged such that a position of the second fuel gas buffer region in plan view and a position of the second oxidant gas buffer region in plan view are shifted from each other as seen from the stacking direction, wherein the resin frame member includes a fuel gas recess and an oxidant gas recess, the fuel gas recess overlapping the second fuel gas buffer region in the stacking direction, the oxidant gas recess overlapping the second oxidant gas buffer region in the stacking direction, and wherein the first fuel gas buffer region is planarly provided on the first separator such that neither a protruding portion nor a recessed portion is provided in the first fuel gas buffer region.

2. The fuel cell according to claim 1, wherein the fuel gas buffer and the oxidant gas buffer each have a triangular shape in front view, and
   wherein the second fuel gas buffer region and the second oxidant gas buffer region are formed at two adjacent sides of a triangle.

3. The fuel cell according to claim 1, wherein the fuel gas recess of the resin frame member is provided with a fuel gas embossed portion, and a top portion of the fuel gas embossed portion contacts the second fuel gas buffer region, and
   wherein the oxidant gas recess of the resin frame member is provided with an oxidant gas embossed portion, and a top portion of the oxidant gas embossed portion contacts the second oxidant gas buffer region.

4. The fuel cell according to claim 1, wherein a planar region of the fuel gas recess of the resin frame member and a planar region of the second fuel gas buffer region are aligned as seen from the stacking direction, and wherein a planar region of the oxidant gas recess of the resin frame member and a planar region of the second oxidant gas buffer region are aligned as seen from the stacking direction.

5. The fuel cell according to claim 1,
wherein the first oxidant gas buffer region is planarly provided on the second separator such that neither a protruding portion nor a recessed portion is provided in the first oxidant gas buffer region.

6. The fuel cell according to claim 1,
wherein the fuel gas buffer and the oxidant gas buffer have triangular shapes in the stacking direction that have a common base and are such that a height of an apex of the fuel gas buffer that is adjacent to the fuel gas manifold and a height of an apex of the oxidant gas buffer that is adjacent to the oxidant gas manifold differ from each other.

7. A fuel cell comprising:
a membrane electrode assembly comprising:
   an electrolyte membrane;
   a first electrode and a second electrode which sandwich the electrolyte membrane therebetween; and
   a resin frame member provided at an outer peripheral portion of the membrane electrode assembly;
separators with the membrane electrode assembly stacked in a stacking direction, a first separator among the separators facing the first electrode including a fuel gas channel, a fuel gas manifold, and a fuel gas buffer, the fuel gas channel allowing a fuel gas to be supplied along an electrode surface, the fuel gas manifold allowing the fuel gas to flow in the stacking direction, the fuel gas buffer connecting the fuel gas channel and the fuel gas manifold to each other;
a second separator among the separators facing the second electrode including an oxidant gas channel, an oxidant gas manifold, and an oxidant gas buffer, the oxidant gas channel allowing an oxidant gas to be supplied along an electrode surface, the oxidant gas manifold allowing the oxidant gas to flow in the stacking direction, the oxidant gas buffer connecting the oxidant gas channel and the oxidant gas manifold to each other;
the fuel gas buffer including a first fuel gas buffer region and a second fuel gas buffer region, the second fuel gas buffer region being more deeply grooved than the first fuel gas buffer region in the stacking direction;
the oxidant gas buffer including a first oxidant gas buffer region and a second oxidant gas buffer region, the second oxidant gas buffer region being more deeply grooved than the first oxidant gas buffer region in the stacking direction and being deeply grooved in a direction opposite to the second fuel gas buffer region;
the second fuel gas buffer region and the second oxidant gas buffer region being arranged such that a position of the second fuel gas buffer region in plan view and a position of the second oxidant gas buffer region in plan view are shifted from each other as seen from the stacking direction;
the resin frame member including a fuel gas recess and an oxidant gas recess, the fuel gas recess overlapping the second fuel gas buffer region in the stacking direction, the oxidant gas recess overlapping the second oxidant gas buffer region in the stacking direction; and
the first fuel gas buffer region is planarly provided on the first separator such that neither a protruding portion nor a recessed portion is provided in the first fuel gas buffer region.

8. The fuel cell according to claim 7, wherein the fuel gas buffer and the oxidant gas buffer each have a triangular shape in front view, and wherein the second fuel gas buffer region and the second oxidant gas buffer region are provided at two adjacent sides of a triangle.

9. The fuel cell according to claim 7, wherein the fuel gas recess of the resin frame member is provided with a fuel gas embossed portion, and a top portion of the fuel gas embossed portion contacts the second fuel gas buffer region, and wherein the oxidant gas recess of the resin frame member is provided with an oxidant gas embossed portion, and a top portion of the oxidant gas embossed portion contacts the second oxidant gas buffer region.

10. The fuel cell according to claim 7, wherein a planar region of the fuel gas recess of the resin frame member and a planar region of the second fuel gas buffer region are aligned as seen from the stacking direction, and wherein a planar region of the oxidant gas recess of the resin frame member and a planar region of the second oxidant gas buffer region are aligned as seen from the stacking direction.

11. The fuel cell according to claim 7, wherein the first fuel gas buffer region is adjacent to the fuel gas channel, and the second fuel gas buffer region is adjacent to the fuel gas manifold, and wherein the first oxidant gas buffer region is adjacent to the oxidant gas channel, and the second oxidant gas buffer region is adjacent to the oxidant gas manifold.

12. The fuel cell according to claim 7, wherein the first fuel gas buffer region is planarly provided at a neutral position of the first separator in the stacking direction, and wherein the first oxidant gas buffer region is planarly provided at a neutral position of the second separator in the stacking direction.

13. The fuel cell according to claim 7, wherein the first oxidant gas buffer region is planarly provided on the second separator such that neither a protruding portion nor a recessed portion is provided in the first oxidant gas buffer region.

14. The fuel cell according to claim 7, wherein the fuel gas buffer and the oxidant gas buffer have triangular shapes in the stacking direction that have a common base and are such that a height of an apex of the fuel gas buffer that is adjacent to the fuel gas manifold and a height of an apex of the oxidant gas buffer that is adjacent to the oxidant gas manifold differ from each other.

* * * * *